J. WULF.
WAGON BRAKE.
APPLICATION FILED MAY 10, 1907.

902,360.

Patented Oct. 27, 1908.

2 SHEETS—SHEET 1.

Witnesses:
Jas. E. Hutchinson
Thos. R. Heath

Inventor
John Wulf,
By [Attorneys]

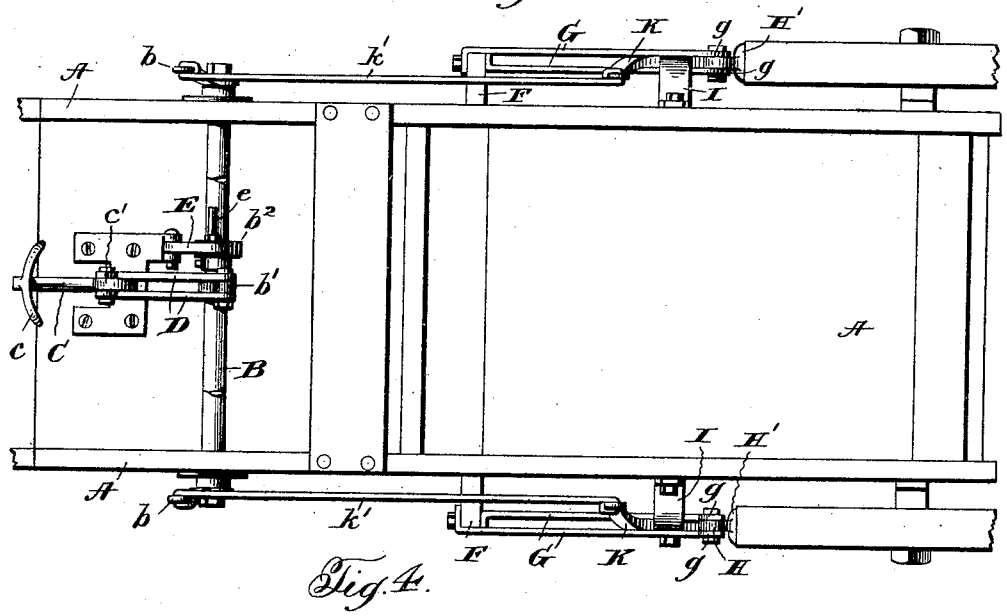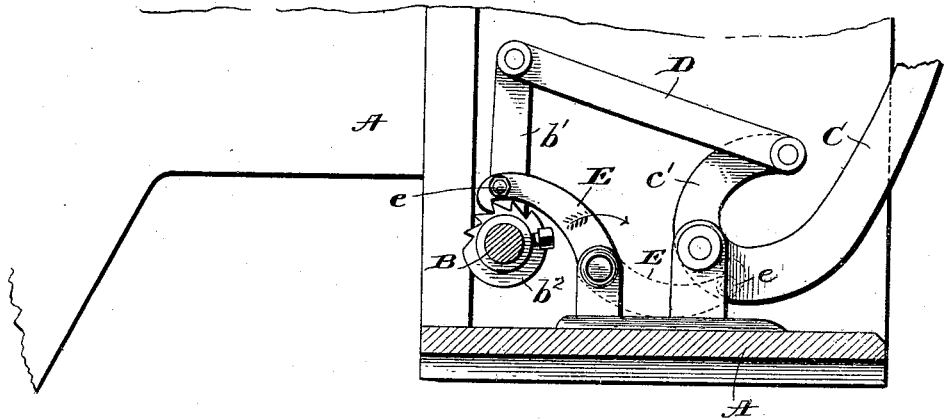

UNITED STATES PATENT OFFICE.

JOHN WULF, OF OMAHA, NEBRASKA.

WAGON-BRAKE.

No. 902,360.

Specification of Letters Patent.

Patented Oct. 27, 1908.

Application filed May 10, 1907. Serial No. 372,943.

*To all whom it may concern:*

Be it known that I, JOHN WULF, a citizen of the United States, residing at Omaha, in the county of Douglas and State of Nebraska, have invented certain new and useful Improvements in Wagon-Brakes, of which the following is a specification, reference being had therein to the accompanying drawing.

This invention relates to an improvement in wagon brakes and the object of the invention is the provision of a brake of this character, which is designed to be operated by the foot of the operator and which may be readily locked in any desired position to maintain any desired degree of friction between the brake shoes and the wheels of the wagon.

A further object of the invention is the provision of means for holding the brake in various positions of adjustment fashioned so as to be readily engaged by the foot of the operator to effect the release of the brake.

Other objects of the invention will be apparent from the detailed description hereinafter, when read in connection with the accompanying drawings forming a part hereof, wherein a preferable embodiment of my invention is shown and wherein like numerals of reference refer to similar parts in the several views.

Figure 1:
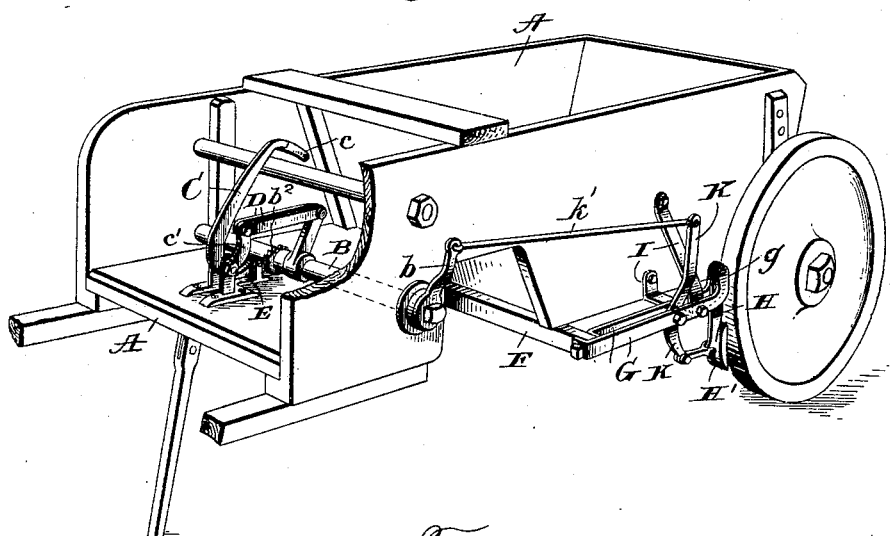
Figure 2:
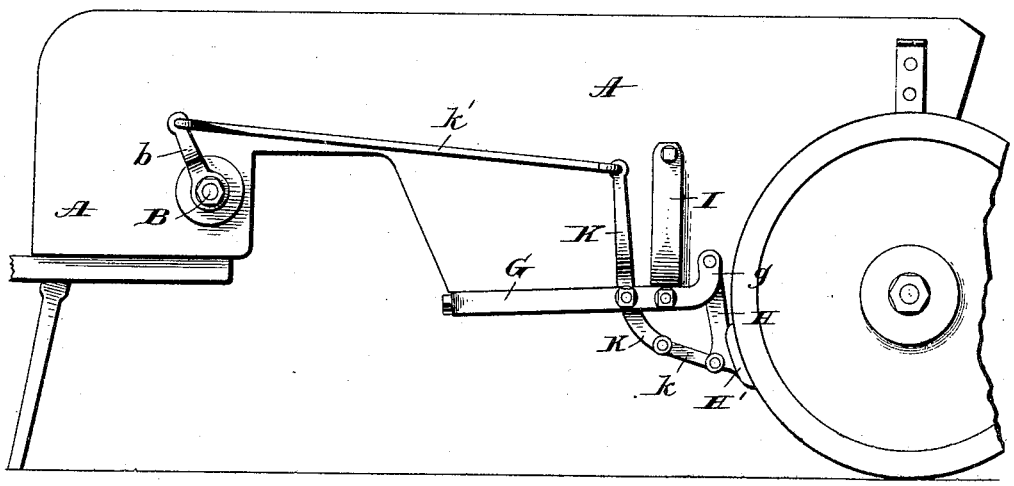

In the drawings, Figure 1 is a perspective view of a wagon equipped with my improved brake, Fig. 2 is a side elevation thereof, Fig. 3 is a plan view thereof, and Fig. 4 is a detail view showing the retaining pawl.

Referring now more particularly to the drawings, A designates a wagon, which may be of any preferred or desired construction. Journaled in the forward end of the body A and extending transversely thereof is a shaft B, the ends of which project beyond the sides of the wagon body and have secured thereto in any suitable manner upwardly extending arms $b$. Secured to the shaft B intermediate the ends thereof is an upwardly extending arm $b^1$ and secured to said shaft at one side of said arm in any suitable manner is a collar $b^2$ which is provided with a plurality of rearwardly extending ratchet teeth around the periphery thereof. Secured to the bottom of the wagon body directly in front of the shaft B journaled therein are a pair of upwardly extending ears between which is pivotally mounted an actuating lever C, which is provided at its upper end with a foot piece $c$ designed to be engaged by the foot of the operator when manipulating the brake. The lower portion of the actuating lever C is curved as at $c^1$, the end of said curved portion $c^1$ extending upwardly above the pivotal connection of the lever with the ears secured to the wagon body and being bent inwardly towards the body of said lever. The extremity of the inwardly bent portion $c^1$ of the actuating lever C is connected to the upper end of the arm $b^1$ secured to the shaft B by means of links D, the ends of which are secured by suitable pivot bolts through said arm and the actuating lever.

Pivotally secured between ears extending upwardly from the wagon body and positioned in advance of the shaft B journaled therein is a gravity pawl E, which is designed to normally engage the ratchet teeth formed on the collar $b^2$ secured to the shaft B. The pawl E is provided adjacent its free end with a laterally extending projection $e$, which constitutes a foot engaging projection whereby said pawl may be readily released from and thrown into engagement with the ratchet teeth on the collar $b^2$ secured to the shaft B. The laterally extending projection $e$ is positioned somewhat below what is the upper edge of the pawl E when the same is in its operative position, so that when the pawl is kicked to its inoperative position said projection will occupy a position slightly above the bottom of the wagon body so that it may be readily engaged by a rearward movement of the foot of the operator and the pawl returned to its normal position.

Projecting laterally from each side of the wagon body medially of the ends thereof is a projection F and secured to each of said projections are the forward ends of a pair of separated arms G which extend rearwardly therefrom and terminate in upwardly bent portions $g$ between which are pivotally secured the hangers H to the lower ends of which are secured brake shoes $H^1$ of any suitable construction. The rear ends of the separated arms G are supported by means of suitable brackets I secured to the sides of the wagon body, said brackets each comprising a piece of strap iron which is secured at its upper end to one side of the wagon body and is bent outwardly therefrom and passes between the rear ends of the separated bars G and is then bent inwardly and secured at its lower end to the wagon body, the portion passing between the bars G being rigidly secured thereto by a suitable bolt passing therethrough. By this construction the rear ends of the bars G will be rigidly supported and maintained at a proper distance from the wagon body so that upon actuation of the brake the brake shoes H¹ will properly engage the peripheries of the rear wheels of the wagon. Pivotally mounted between the separated bars G intermediate the ends thereof are arms K, the lower ends of which are pivotally connected by suitable links k with the lower ends of the hangers H and the upper ends of which are pivotally connected by suitable links k¹ with the outer ends of the arms b secured to the ends of the shaft B.

From this construction it will be apparent that the brake may be actuated solely by the foot of the operator and can be locked in any desired position to maintain the desired degree of friction between the brake shoes and the peripheries of the wheels and can also be quickly and easily unlocked to effect the release of the brakes.

I do not desire to limit myself to the precise form and construction shown in the drawings, as it is obvious that many minor changes might be made thereto without in any way departing from the spirit of the invention as defined in the appended claims.

Having thus described the invention what I claim as new and desire to secure by Letters Patent is:—

1. In a wagon brake, an actuating shaft provided with a ratchet and with an offset portion, an actuating lever fulcrumed in front of said actuating shaft provided with an upwardly curved lower portion, a connection between the curved end of said lever and the offset portion of the actuating shaft, and a pawl engaging the ratchet on the actuating shaft, said pawl being provided with a foot engaging portion.

2. In a wagon brake, in combination with a support, an actuating shaft extending transversely of the support and positioned thereabove, a ratchet carried by said actuating shaft, a pawl pivoted to said support adapted when in its operative position to coöperate with said ratchet and to rest upon said support when in its inoperative position, said pawl being provided adjacent the free end thereof with a laterally extending foot engaging portion adapted to lie in a plane above the support when the pawl is in its inoperative position.

3. In a wagon brake, in combination with a support, an actuating shaft extending transversely of the support and positioned thereabove, a ratchet carried by said actuated shaft, and a gravity pawl pivoted to said support adapted when in operative position to coöperate with said ratchet and to rest upon said support when in inoperative position, said pawl being provided with a laterally extending foot engaging portion adapted to lie in a plane above the support when the pawl is in its inoperative position.

4. In a wagon brake, the combination with a support, an actuating shaft extending transversely of the support and journaled thereabove provided with an upwardly extending arm intermediate the ends thereof, an actuating lever pivoted on said support in front of said actuating shaft, said lever having a curved lower portion extending upwardly above the pivot point thereof and having its end bent inwardly towards the body portion of said lever, and a connection between the inwardly bent end of said lever and the free end of the arm extending from the actuating shaft.

5. In a wagon brake, the combination with a support, an actuating shaft extending transversely of the support and journaled thereabove provided with an upwardly extending arm intermediate the ends thereof, a foot lever pivoted on said support in front of said actuating shaft said lever having a curved lower portion extending upwardly above the pivot point thereof and inwardly towards the body portion of said lever, and a link pivotally connecting the inwardly bent extremity of the foot lever and the outer end of the arm carried by the actuating shaft.

6. In combination with a wagon body, a pair of rearwardly extending arms secured at their forward ends to opposite sides of the wagon body, brackets secured to the opposite sides of the wagon body and engaging the rear ends of said arms, brake shoe hangers depending from said arms, levers pivoted to said arms and connected to said brake shoes, and means for actuating said levers.

7. In combination with a wagon body, rearwardly extending arms secured at their forward ends to opposite sides of said wagon body, brackets secured to the sides of the wagon body and supporting the rear ends of said arms, brake hangers depending from said arms, levers pivoted to said rearwardly extending arms and having their lower ends connected to said brake hangers, an actuating shaft journaled in the wagon body and provided with arms extending laterally from the ends thereof, links pivotally connecting the free ends of the arms extending from the actuating shaft and the upper ends of the levers pivoted to the rearwardly extending arms, and means for operating said actuating shaft.

In testimony whereof I affix my signature in presence of two witnesses.

JOHN WULF.

Witnesses:
 H. E. OWEN,
 CHANDLER OWEN.